United States Patent Office 3,403,949
Patented Oct. 1, 1968

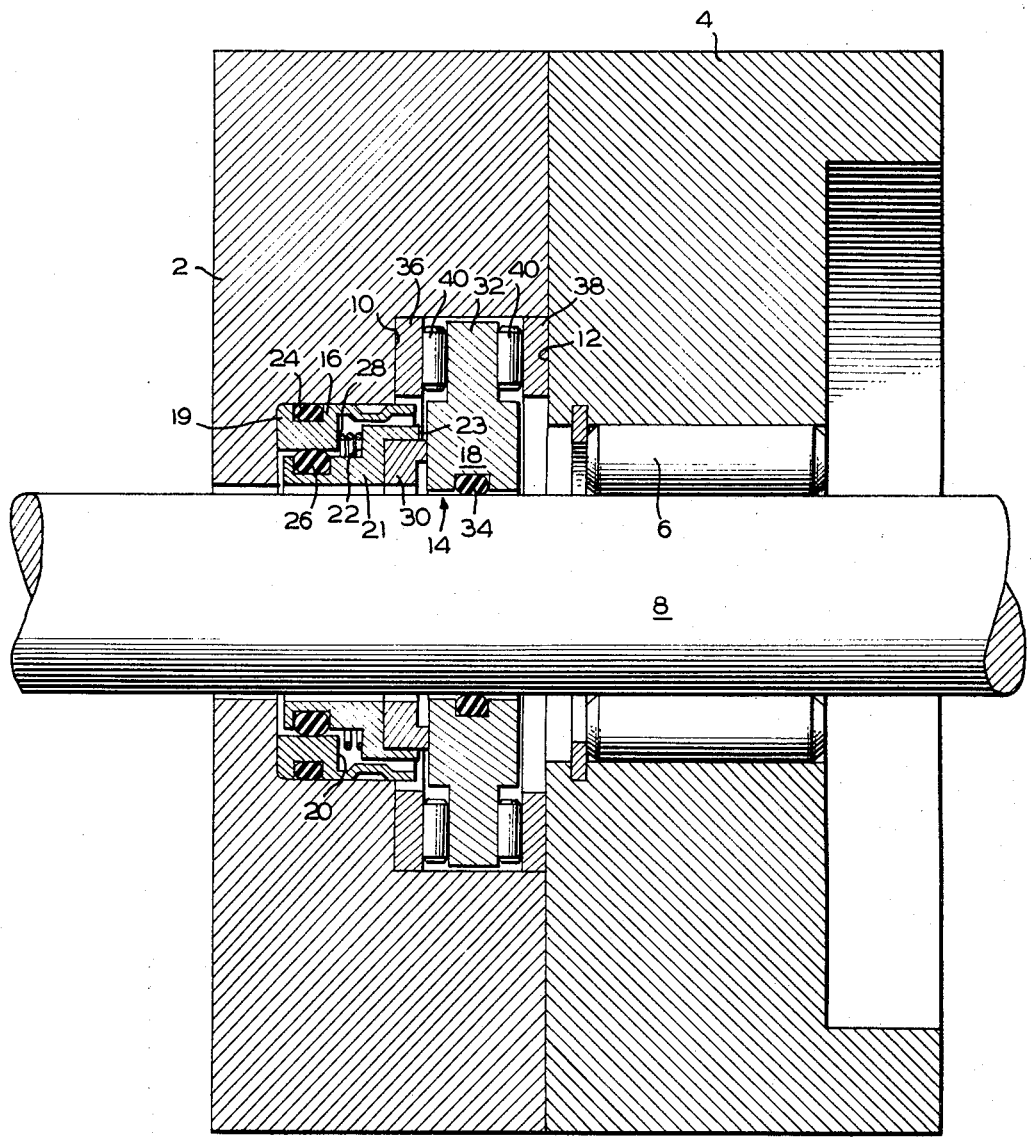

3,403,949
SEAL FOR ROTATING SHAFT
William R. Leissner, Brookfield, Wis., assignor to Applied Power Industries, Inc., Milwaukee, Wis., a corporation of Wisconsin
Filed Oct. 23, 1965, Ser. No. 503,717
4 Claims. (Cl. 308—187.1)

ABSTRACT OF THE DISCLOSURE

A mechanical seal assembly for a shaft rotating in a housing in which a stationary axially biased sealing portion is mounted therearound having an axially translatable mating ring carried by the shaft in axial engagement with the sealing portion, the mating ring having opposite sides subjected to fluid from a common pressure source and also having an annular seal disposed between it and the shaft to block fluid flow therebetween, an interference fit between the seal, the ring and the shaft such that the ring is rotatably fixed to the shaft, and bearing means rotatably engaging the ring to block axial movement thereof with respect to the housing.

This invention relates generally to seals and more particularly to high pressure seals for rotating shafts.

Present art shaft seals of the type to which this invention pertains are characterized by a stationary fluid seal axially biased into abutting sealing relation with a rotating mating ring fixed to the shaft to which the seal is applied. Since the mating ring is fixed, a major problem with seals of this type has resulted from shaft "end play" or the inherent axial movement of the shaft which exists in most industrial products. The "end play" repeatedly superimposes additional mechanical forces between the mating ring attached to the shaft and the stationary fluid seal thereby causing premature seal failure in many applications.

It is an object of this invention to avoid the above-mentioned difficulties by providing a mating ring for seals of the type described which will maintain a contact with substantially constant force on the stationary seal regardless of axial movement of the shaft on which it is mounted.

It is another object of this invention to maintain constant force between a mating ring and stationary seal in a shaft seal of the type described by providing means to fix the mating ring to the shaft to be sealed so that it is both rotatable and axially translatable therewith.

It is a further object of this invention to axially fix a mating ring with respect to a stationary seal in a shaft seal of the type described by providing means fixed to the seal housing to rotatably engage the mating ring.

These and other objects of this invention will become more apparent to those skilled in the art by reference to the following detailed description when viewed in light of the accompanying drawing.

Although pumps and hydraulic motors are common applications for seals of the type to which this invention relates, the seal of this invention may also be applied to the sealing of any fluid medium, whether or not a pressure differential exists across the seal.

Referring to the figure, a seal housing 2 is mounted on an end of a machinery housing 4. A bearing 6, in the machinery housing, rotatably supports a shaft 8 which extends through both housings. The seal housing 2 is provided with a chamber coaxially disposed therein, the chamber having an enlarged portion axially defined by transverse walls 10 and 12.

A seal assembly, generally indicated at 14, is disposed in the chamber of the housing 2 and serves to block fluid flow along the shaft 8 between a high pressure area in the housing 4 and the exterior of the housing 2.

The seal assembly comprising a portion 16 which cooperates with a rotating mating ring 18 on the shaft 8 to provide the sealing surface for the assembly. The portion 16 is composed of a fixed stationary ring member 19 with a transverse face 20, fitted in the reduced portion of the chamber in the housing 2 and an axially movable annular member 21, having outer and inner transverse faces 22 and 23, telescopically disposed on the ring member 19. The member 19 is provided with a circumferential recess and an outer elastomeric seal or O ring 24 to furnish a seal between the member and the wall of the housing 2 while the annular member 22 has a circumferential groove and an inner elastomeric seal or O ring 26 to furnish a seal between the members 24 and 26.

A wave spring 28 or other suitable biasing element is disposed between opposed transverse surfaces 20 and 22 of the ring member 19 and the annular member 21 and serves to bias the annular member toward the mating ring 18. A metallic seal ring 30 is fixed on the transverse face 23 of the annular member 21 and abuts the mating ring 18 to form a sliding seal therebetween. The elements of portion 16 of the seal as thus far described are standard in the art and do not constitute part of this invention. Any stationary seal of the same general type may be used in conjunction with this invention without exceeding the scope thereof.

The mating ring 18 has a reduced, transversely extending outer portion 32 around the outer periphery thereof and is provided with a groove around the inner periphery thereof containing an annular elastomeric seal to O ring 34 to provide a fluid seal between the mating ring 18 and the shaft 8. The fit between the shaft 8 and the mating ring 18 through the elastomeric seal 34 is sufficient to substantially fix the mating ring for rotation with the shaft, as will be further described below, and yet permit axial translation therebetween.

Annular bearing races 36 and 38 are provided on the transverse walls 10 and 12 respectively to axially support a plurality of roller or needle bearings 40 which in turn engage the transverse faces of the outer portion 32 of the mating ring 18. The bearings 40 function as radial thrust bearings to absorb any axial loads imposed by the mating ring 18 and to limit the axial movement thereof to distances dictated by the "stack" height of the races 36 and 38, bearings 40 and the mating ring outer portion 32.

The unit is so designed that the interference or "hugging" force of the O ring 34 is greater than the friction force from the bearings 40 and the seal ring 30 so that the mating ring 18 will rotate with the shaft 8. The hugging force will, of course, increase with a rise in pressure in the main cylinder chamber.

With fluid pressure originating in the interior of the housing 4, the seal assembly operates as follows: fluid under pressure flows around the outer periphery of the outer portion 32 of the mating ring 18 through the bearings 40 and into the stationary portion 16 of the seal assembly. The fluid pressure acts between the fixed ring 19 and the annular member 21 against the outer transverse face 22 of the annular member 2 and, in conjunction with the variable force from the spring 28, forces the seal ring 30 against the face of the mating ring 18. This total force is determined by the differential areas of the outer transverse face 22 and the inner transverse face 23, the force from spring 28 and the differential area exposed to fluid pressure of the transverse faces of the mating ring 18. Since the mating ring 18 is substantially fixed in an axial direction by the bearings 40, end play or axial movement of the shaft 8 will result in axial translation between the mating ring 18 and the shaft. The load imparted to the mating ring by this translation will be absorbed by the bearings 40 so that the outside mechanical forces are isolated from the contact area between the mating ring 18 and the seal ring 30. The sealing force between the mating ring 18 and the seal ring 30 is therefore dependent only upon fluid pressure variation and is independent of axial loads transmitted by the mating ring. This system avoids excessive and/or repetitive loads superimposed on the seals and thereby prevents premature failure of the seal from this source.

What has been set forth above is intended as exemplary to instruct those skilled in the art in the practice of the invention. It should therefore be understood that, within the scope of the appended claims, the invention may be practiced other than as specifically taught.

What is new and therefore desired to be protected by Letters Patent of the United States is:

1. A mechanical seal assembly comprising:
   a housing defining a chamber in communication with a source of pressurized fluid;
   a shaft extending through said chamber;
   an axially translatable mating ring carried by said shaft, a seal disposed between said ring and said shaft to block fluid flow therebetween, an interference fit between said seal, said mating ring and said shaft rotatably fixing said mating ring to said shaft;
   said mating ring having opposite sides subjected to fluid from said source;
   means rotatably engaging said ring to block axial movement thereof with respect to said housing; and
   stationary sealing means mounted in said chamber and axially biased into contact with said mating ring to provide a fluid seal therebetween.

2. In a seal assembly for a shaft rotating in a housing in which a stationary axially biased sealing portion is mounted therearound, the improvement comprising an axially translatable mating ring carried by said shaft in axial engagement with the sealing portion, said mating ring having opposite sides subjected to fluid from a common pressure source, an annular seal between said mating ring and the shaft to block fluid flow therebetween, an interference fit between said seal, said ring and said shaft being such that said ring is rotatably fixed to said shaft, and means rotatably engaging said ring to block axial movement thereof with respect to the housing.

3. A mechanical seal assembly comprising:
   a seal housing having a chamber therein, said chamber having an enlarged portion including opposing radially extending walls thereto;
   a shaft extending through said chamber;
   an axially translatable mating ring carried by said shaft and extending into the enlarged portion of said housing, said mating ring having opposite sides subjected to fluid from a common pressure source, sealing means for preventing the flow of fluid between said mating ring and said shaft, an interference fit between said sealing means, said mating ring and said shaft rotatably fixing said mating ring to said shaft, bearing means between said mating ring and each of said transverse walls to limit axial movement of said mating ring, and a radially extending sealing face on said mating ring; and
   a stationary portion carried by said housing, said portion including a seal ring having a radially disposed sealing face engaging the sealing face of said mating ring, means to axially bias said sealing ring into engagement with said mating ring, and a seal means for preventing the flow of fluid between said stationary portion and said housing.

4. A mechanical seal assembly comprising:
   a seal housing having a chamber therein, said chamber having an enlarged portion including opposing radially extending walls;
   a shaft extending through said chamber;
   an axially translatable mating ring carried by said shaft and extending into the enlarged portion of said housing, a resilient annular seal between said mating ring and said shaft for preventing flow of fluid therebetween, an interference fit between said sealing means, said mating ring and said shaft rotatably fixing said mating ring to said shaft, an annular bearing race disposed on said radially extending walls, a plurality of radially disposed roller bearings between said mating ring and each of said races to limit axial movement of said mating ring, and a radially extending sealing face on said mating ring; and
   a stationary portion carried by said housing, said portion including a seal ring having a radially disposed sealing face engaging the sealing face of said mating ring, means to axially bias said sealing ring into engagement with said mating ring, and a seal means for preventing the flow of fluid between said stationary portion and said housing.

References Cited

UNITED STATES PATENTS 2,826,465  3/1958  Gordon _____ 308—187.1

MARTIN P. SCHWADRON, *Primary Examiner.*

FRANK SUSKO, *Assistant Examiner.*